Feb. 8, 1955   C. H. STEVENSON III   2,701,650
PALLET LOADING DEVICE
Filed June 9, 1948   7 Sheets-Sheet 1

INVENTOR.
CLARENCE H. STEVENSON III
BY
*J. F. Cuneo*
ATTORNEY

Feb. 8, 1955

C. H. STEVENSON III 2,701,650

PALLET LOADING DEVICE

Filed June 9, 1948

INVENTOR.
CLARENCE H. STEVENSON III
BY
*J. F. Cuneo*
ATTORNEY

Feb. 8, 1955     C. H. STEVENSON III     2,701,650
PALLET LOADING DEVICE

Filed June 9, 1948     7 Sheets-Sheet 4

INVENTOR.
CLARENCE H. STEVENSON III
BY
J. F. Cuneo
ATTORNEY

Feb. 8, 1955  C. H. STEVENSON III  2,701,650
PALLET LOADING DEVICE
Filed June 9, 1948  7 Sheets-Sheet 6
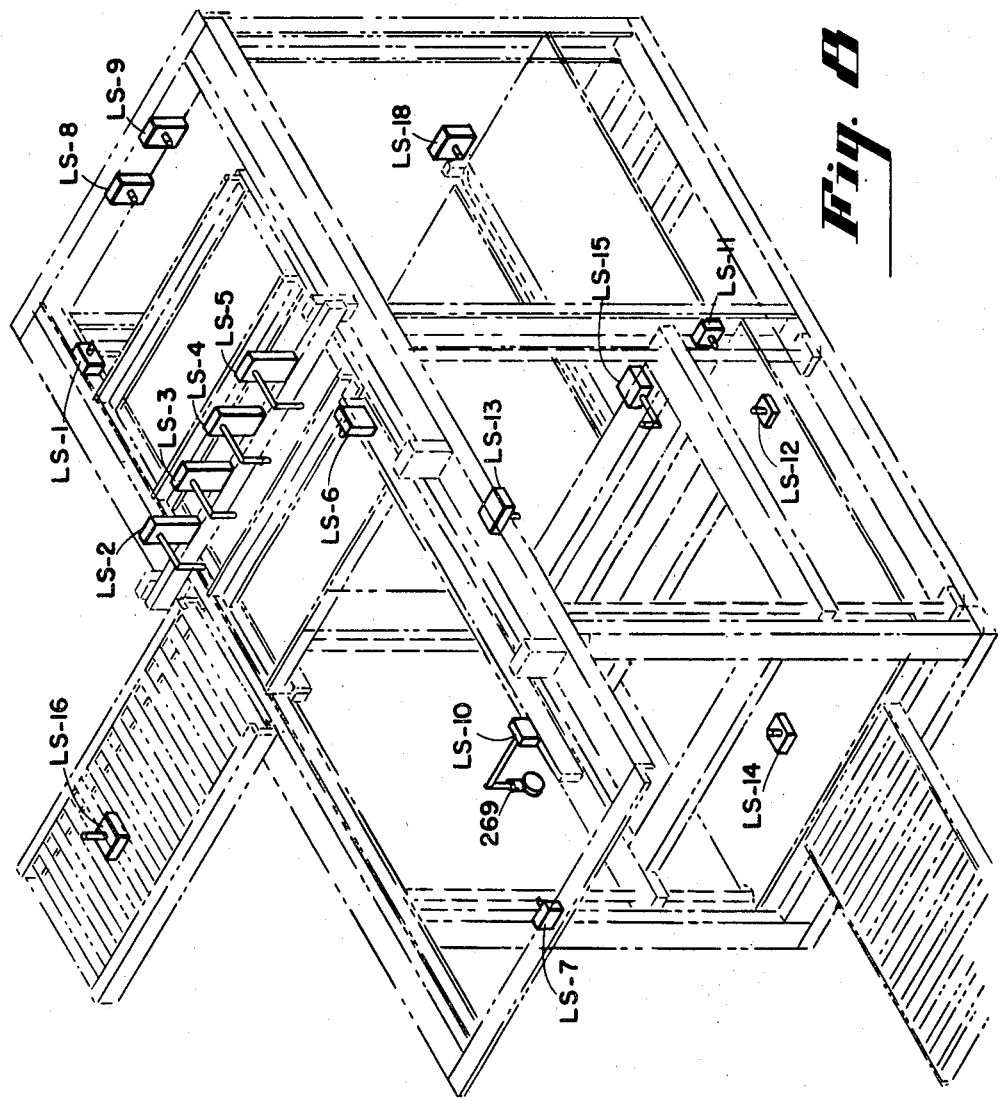
INVENTOR.
CLARENCE H. STEVENSON III
BY
*J. F. Cuneo*
ATTORNEY

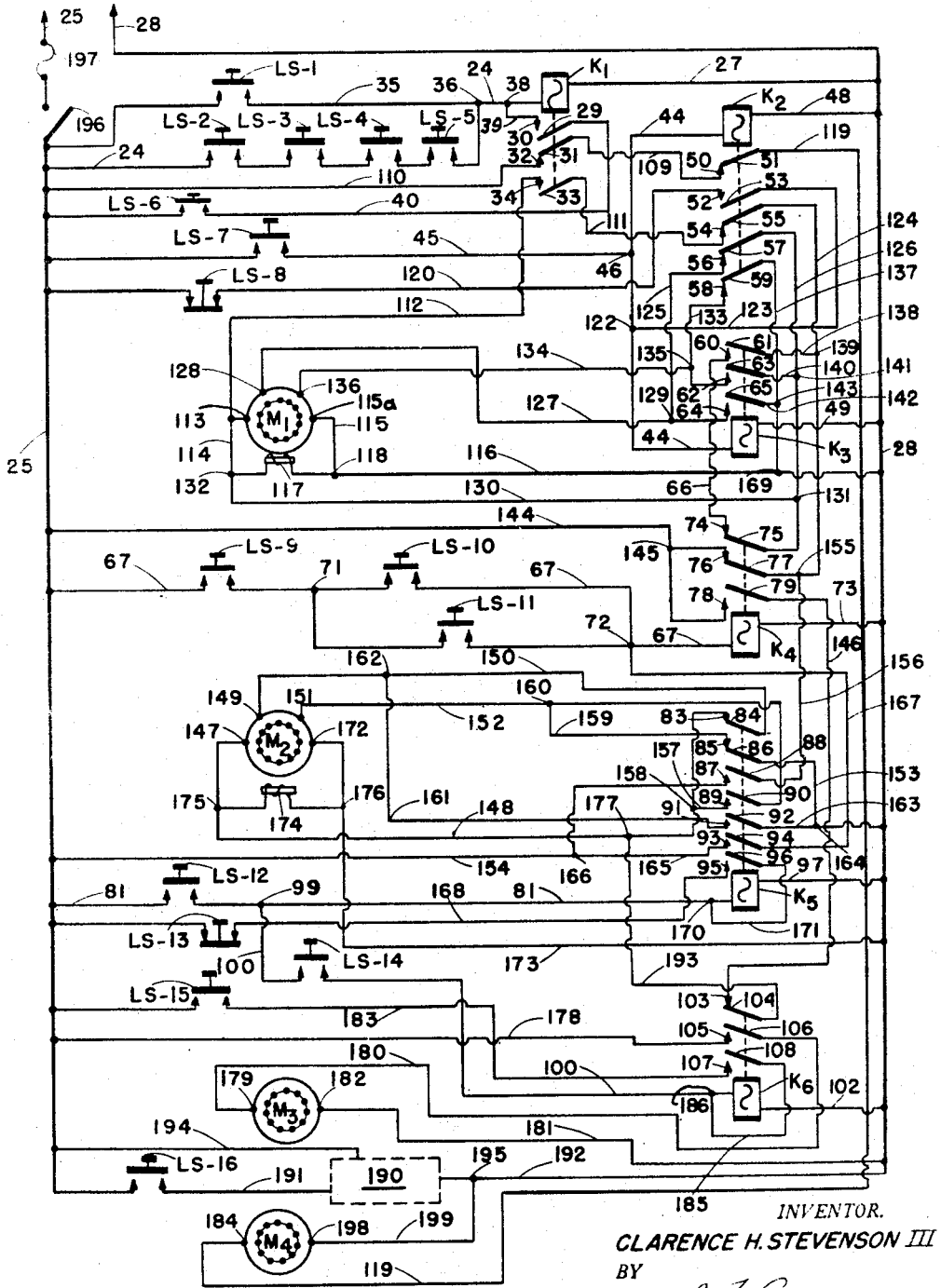

United States Patent Office 2,701,650
Patented Feb. 8, 1955

2,701,650

PALLET LOADING DEVICE

Clarence H. Stevenson III, Los Angeles, Calif.

Application June 9, 1948, Serial No. 31,961

39 Claims. (Cl. 214—6)

This invention relates to loading devices and in particular to automatic pallet loading machines.

The object of this invention is to provide a pallet loading machine that is capable of mechanically performing all of the various steps required in loading a pallet including conveying the articles to be loaded from the end of an assembly line onto the pallet in the desired manner.

Another object of this invention is to provide a device capable of discharging a pallet when fully loaded and replacing the loaded pallet with an empty one without any interruption in the loading cycle.

A further object of my invention is to provide a pallet loading machine that will load cartons or other objects in any predetermined pattern regardless of the height or shape of the articles, thereby insuring maximum stability to a load.

Another object of this invention is to provide a machine that is capable of loading rectangular articles having one side longer than the other in such a manner that the long side of the carton will face one way in one layer and the next layer will be deposited with the long side of the carton turned up to 90° with respect to the corresponding side of the article below it in the previous layer. This has the effect of locking the end of the cartons or articles to each other as they are stacked.

Heretofore the loading of pallets used for conveying stacked cases or cartons has been generally done by hand. When the pallet is fully loaded it is picked up by a lift truck and carried away. This method has proven to be quite expensive, time-consuming, requires a large crew of workers and presents a considerable safety hazard, particularly when the cartons or cases are large or heavy and the pallets are loaded to any considerable height.

Another disadvantage of hand loading is that the cases or cartons are generally handled several times between the time they come off the assembly line and the time when they are finally stacked on the pallet. It is difficult to stack loads uniformly by hand particularly when the cartons or containers are large or heavy, therefore, considerable time is wasted and the final loading may result in an unstable load.

Another disadvantage of hand loading is that the height to which the pallet can be loaded is naturally limited due to the fact that it is not practical for the loading crew to stack cases any appreciable height above the waist of the operator.

According to my invention, I overcome all the above limitations and all the undesirable features of hand loading by the provision of a fully automatic pallet loading machine according to my invention that is capable of taking cases, articles or cartons coming off of the production line or conveyor, arranging cartons on a collector plate in a predetermined manner, depositing the completed layer on a pallet, repeating this above operation until the pallet is fully loaded, discharging the loaded pallet to a location where it can be picked up by a lift truck, replacing the discharged pallet with an empty one and raising the empty pallet into position thereby making it possible for the machine to repeat the above cycle.

A particular feature of my machine is a device that automatically orients the articles, particularly rectangular objects as they travel to the collector plate on the conveyor that transfers the articles from the assembly line to the collector plate. The device is designed to automatically vary the orientation of the articles of each respective layer as desired. For example, the long side of the carton or case may face one way in the first layer while in the second layer the long side of the carton can be oriented up to 90° with respect to the long side of the first layer and the articles in the succeeding layers alternating in position in the same manner as those in the first and second layers.

Another feature of my device is that it is capable of handling any size box, carton or other container, as long as it does not exceed the capacity of the machine, and accomplishes this with the same ease regardless of whether the cartons are large or small, heavy or light.

A further feature of my invention is the fact that cartons may be stacked up to any height on a pallet, the only limitation being the capacity of the machine.

The device according to my invention comprises essentially a supporting framework divided into a forward and rearward compartment, a reciprocating collector plate with a plurality of receiving zones, which travels the length of the combined forward and rearward compartments in either direction, an elevator platform, or other transfer means, located in the forward compartment on which the empty pallet to be loaded rests and from which it is discharged when fully loaded by a mechanism located in the rearward compartment which drives an empty pallet into the forward compartment displacing the fully loaded one from the forward compartment, and an empty pallet storing device located in the rearward compartment from which an empty pallet is released each time an empty pallet is to be fed into the forward compartment when the fully loaded pallet is ready to be discharged.

The device is further provided with a feed conveyor that takes fully loaded articles from the conveyor belt of an assembly line and conducts them onto the collector plate of the pallet loading device arranging the articles on the collector plate in any desired pattern.

A particular advantage of the device is that the machine is capable of operating entirely without supervision it only being necessary that empty pallets are kept supplied in the pallet storing device in the rearward compartment.

Another advantage of the device is the fact that it is capable of stacking articles on pallets more stably since each article is deposited in the best position to impart maximum stability to the load.

Another advantage is that the pallet loading machine, according to my invention, is capable of varying the orientation of each layer of articles thereby locking the ends of the articles and imparting maximum stability to the load.

A further advantage is that the pallets may be stacked as high as desired up to the capacity of the machine, thus effecting a considerable saving in time and equipment.

The foregoing and other objects of my invention will be better understood with reference to the following drawings in which:

Fig. 8 is a phantom drawing of the device showing the location of the switches according to one embodiment of the invention; and Fig. 9 is a schematic wiring diagram showing one manner in which the various electrical units of the device are coupled together.

Figure 1:
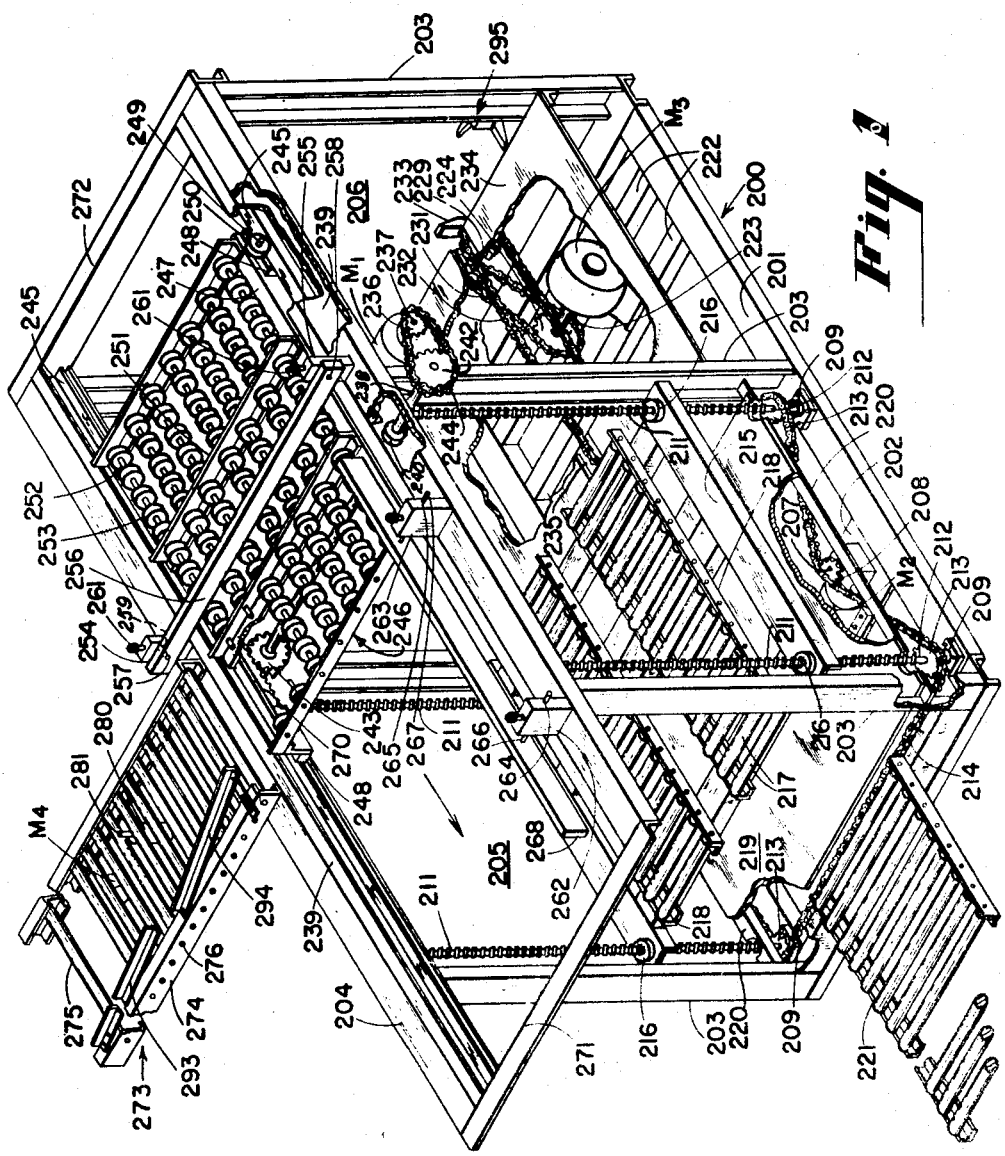
Fig. 1 shows a perspective view of the assembled device.

The description of the device is divided into three parts for the sake of clarity. These divisions are mechanical construction, the electrical system, and the operation of the device.

MECHANICAL CONSTRUCTION

The mechanical portion of the device comprises essentially a framework, an elevator assembly, or other transfer means such as a conveyor belt, etc., a reciprocating collector plate assembly, and a feed conveyor assembly that transfers articles from the end of the assembly line to the collector plate.

The framework 200 is preferably constructed of suitable structural members such as bars, I beams, angles, channels, etc. The bottom and top members or framed structures 201 and 204, respectively, of said framework 200, are preferably rectangular. The upright members 203 of said framework 200 and the rectangular bottom member 201 and top member 204 thereof are secured together by any suitable means such as welding, bolting, etc. The central upright members 203 divide the box-like structure into a forward compartment 205 and a rearward compartment 206. These compartments are preferably proportioned to be of approximately the same size.

An electrical motor $M_2$ is secured to a reinforcing brace 202 which is attached transversely to the bottom member 201 in the portion lying within the boundaries of the forward compartment 205. Motor $M_2$ is preferably provided with a suitable reduction gear which places the driven shaft 207 of the Motor $M_2$ in a vertical position.

Motor $M_2$ is of a type that can be easily reversed. The preferred form of motor is one which may be reversed by changing the polarity of the field, and for optimum preformance should be preferably equipped with a solenoid brake or other suitable device for braking the motor and stopping it quickly. Such a motor is shown schematically in the wiring diagram of Fig. 9. A sprocket 208 is secured to motor shaft 207.

Four radial thrust bearings 209 are securely attached at each of the four corners of the rectangular base portion 201 lying within the forward compartment 205. An equal number of radial thrust bearings 210 are installed on the underside of the top rectangular frame 204 at positions corresponding to the position of bearings 209 and are also within the forward compartment 205. Four lead screws 211 having their ends 212 machined to fit in the upper and lower bearings 210 and 209 are provided with sprockets 213 which are secured to the machined portions of the lead screws 211 just above the portions of said screws that seat within the bearings 209. These sprockets may be keyed or splined to lead screws 211 or may be an integral portion of the lead screws, or may be attached permanently thereto by welding, brazing, etc. When assembled on the bottom rectangular member 201, lead screws 211 are in a vertical position. An endless chain 214 passes over each of the sprockets 213 and integrates the motion of each lead screw 211 to the remaining lead screws. The chain 214 also passes over the sprocket 208 secured to the shaft driven by motor $M_2$ and is driven by this sprocket. Therefore, motor $M_2$ operates all lead screws 211 simultaneously.

A pallet lift platform 215, which covers approximately the same area as that circumscribed by the portion of the rectangular bottom member 201 constituting the base of the forward compartment 205, is proportioned to move freely up and down in compartment 205. Platform 215 may be made solid, or may be a framed structure as shown in Fig. 1, and. if desired, may be provided at each of the four corners thereof with a threaded bushing 216 machined to correspond with the threads of the lead screws 211. These bushings 216 are secured to the corners of platform 215 by any suitable means such as bolting, welding, brazing, threading, or each bushing may be provided with a shoulder and inserted into a hole in each corner and extend beyond the platform a distance sufficient to permit the projecting end to be threaded so that it may be clamped to the platform by nuts.

The upper surface of pallet lift platform 215 is preferably provided with a plurality of freely rotating rollers 217, mounted on an axle supporting frame 218, which frame extends substantially from the forward end to the rearward end of the platform 215. These rollers may be a double set of rollers supported by a pair of parallel frames 218 as shown in Fig. 1, or may comprise a single group of longer rolls extending substantially the entire width of the pallet lift platform 215.

A plate 219 is preferably employed to substantially cover motor $M_2$, sprockets 208 and 213, lower bearings 209, and chain 214. When employed, plate 219 is preferably secured to tie members 220 which are attached to upright members 203 and extend the length of the forward compartment. A normally open switch LS-12 is secured to one of said tie members 220 in such a position that pallet lift platform 215 will cause it to close when platform 215 has reached its lowest point of travel.

A normally open switch LS-11 is attached to the side of central vertical member 203 within the forward compartment 205 at a point slightly above that of open switch LS-12. A third normally open switch LS-14 is located on plate 219 or at any convenient position where a fully loaded pallet (not shown) will cause it to close. This switch, however, is designed so that it will not close from the weight of the empty pallet alone.

A roller conveyor 221 of any standard design, wide enough to support a fully loaded pallet, is secured to the forward end of rectangular base 201 at a position corresponding to that of rollers 217 located on the pallet lift platform 215.

The rectangular portion of the bottom member 201 constituting the base of the rearward compartment 206 is provided, for a purpose about to be described, with suitable bracing such as cross members 222 which extend transversely across the rectangular portion of said bottom member 201 lying within compartment 206.

Figure 3:
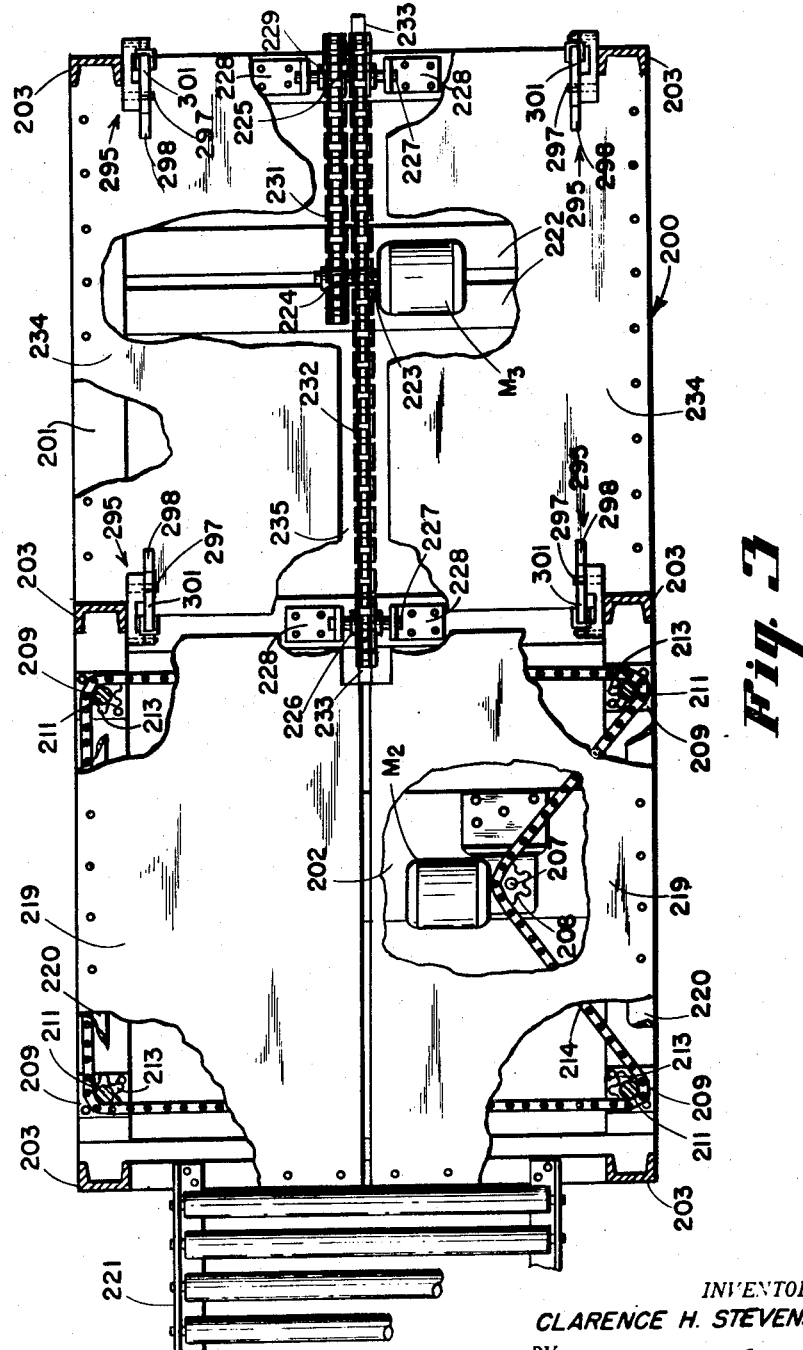
Fig. 3 is a plan view, partly in cross section, showing the mechanism at the base of the device.

A motor $M_3$ is secured to the cross members 222. Rotor shaft 223 of motor $M_3$ is provided with a sprocket 224. A pair of sprockets 225 and 226 are mounted on shafts 227 and aligned parallel to the cross members 222 near the forward and rearward edges of the rear compartment 206. These shafts are supported by suitable bearings 228 as shown in Fig. 3. A second sprocket 229 is secured to the same shaft as sprocket 225 by any suitable means such as set screws, keys or splines as shown in Figs. 1 and 3. Sprocket 229 is aligned to correspond with sprocket 224 that is attached to the shaft of motor $M_3$. An endless chain 231 passes over sprockets 229 and 224 while a second endless chain 232 passes over the two sprockets 225 and 226. Chain 232 is provided with a pair of symmetrically spaced lugs 233 which are attached to the chain and extend a substantial distance above the links of chain 232.

The lower portion of rear compartment 206 may also be provided with a pair of suitable covering plates 234 spaced a sufficient distance apart to provide a central longitudinal gap 235 which will permit free passage of lugs 233 as they travel from the rear to the front of the compartment 206. Plates 234 are secured to the rear and central upright members 203 at a height sufficient to permit lug 233 to extend the required distance above the top edge of the plates 234 when it is traveling from the rear to front.

A normally closed switch LS-18 is positioned at the rearward end of rearward compartment 206 and is located to permit lugs 233 to open the switch after the lugs traveling rearwardly rise above the surface of covering plates 234 at the end of their lower horizontal travel.

A third motor $M_1$ is preferably attached to one of the central vertical members 203 which divide the forward compartment 205 from the rearward compartment 206 as shown in Fig. 1. Motor $M_1$ is also of the type that may be reversed easily and is preferably a type of motor that will be reversed when the field connections are reversed. Motor $M_1$ should be preferably provided with a solenoid brake or other suitable device to stop its rotation the instant the motor windings are deenergized. A sprocket 236 is secured to shaft 237 of motor $M_1$.

Vertical members 239 are attached to the inner faces of the sides of the top member 204 by bolting, welding, etc., and extend substantially the length of said top member. A clearance hole is bored in each vertical member 239 near the rearward end of forward compartment 205. Bearings 240 are secured to vertical members 239 so that the center of each bearing is concentric with the center of the clearance hole.

A shaft 238 is mounted on bearings 240 and extends completely across the top rectangular member 204 preferably projecting a substantial distance from the forward side, that is, the side opposite a feed conveyor 273 hereinafter described. A sprocket 242 is attached to shaft 238 and is aligned with sprocket 236, secured to motor $M_1$. A pinion gear 243 which engages a corresponding rack 270 is attached near the opposite end of the shaft 238 from that to which sprocket 242 is attached. An endless chain 244 engages the teeth of sprockets 236 and 242 imparting the motion of motor $M_1$ to shaft 238 and gear 243.

The top rectangular member 204 is provided with tracks 245 which are attached to it on each side and positioned below the top surface of said member 204. These tracks extend substantially the entire length of the top rectangular member 204. A collector plate assembly 246 travels on tracks 245.

Figure 4:
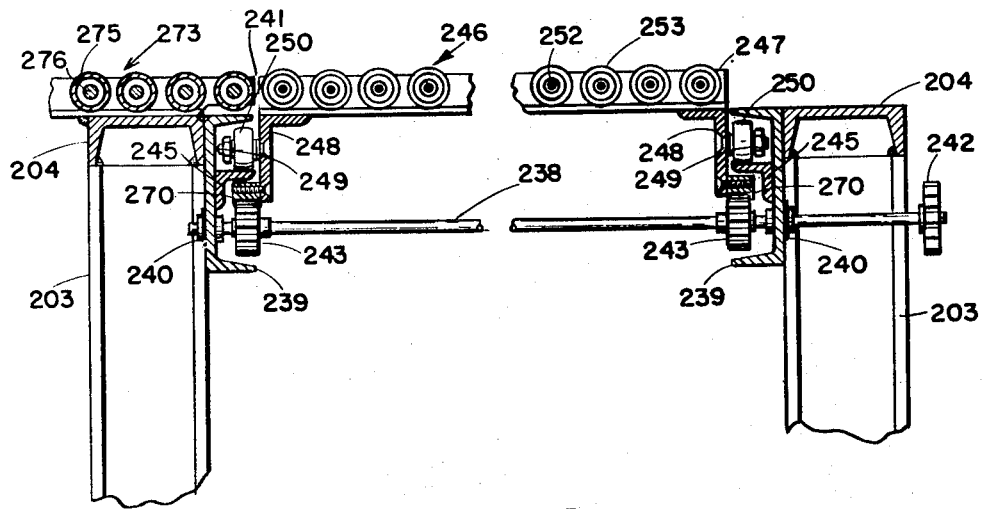
Fig. 4 is a view, partly in cross section, showing the manner in which the collector plate is made reciprocable on the supporting framework.

Collector plate assembly 246 comprises a rectangular frame 247 provided with axle supports 248 that are secured to the sides of frame 247. A corresponding number of axles 249 and wheels 250 are mounted on the axle supports 248. The distance between corresponding wheels is adjusted to permit the wheels to travel on tracks 245 as shown in Figs. 1 and 4. The track 245 should be sufficiently long to allow the forward end of collector plate assembly 246 to travel up to end 271 and the rearward end of the collector plate assembly to travel in the reverse direction and reach end 272 of rectangular top member 204. The side 241 of collector plate frame 247, parallel to the side of rectangular member 204, is provided with a rack 270 which is preferably secured to corresponding wheel supports 248. The teeth of rack 270 corresponds to the teeth of pinion gear 243 and engages the teeth of the pinion gear at all times. The rotation of motor $M_1$ revolves shaft 238 and gear 243 driving the collector plate assembly 246 forward or backward on tracks 245. For sake of clarity and simplicity of description the collector plate assembly 246 will hereinafter be referred to as the collector plate 246.

An alternate construction comprises a rack on either side attached to the corresponding axle supports on each side of collector plate frame 247. This construction requires a corresponding pinion gear mounted on shaft 238 in a position to mesh with the second rack, as shown in Fig. 4.

The central portion of the collector plate frame 247 is stiffened by one or more cross members 251 which extend perpendicularly to the direction of travel of the collector plate 246 and are preferably positioned to divide the surface of collector plate 246 into a number of equal sections or zones. These cross members 251 may be angles as shown in Fig. 1, or any other suitable structural shape and are attached to the collector plate frame 247 by bolting, welding, etc. A plurality of shafts 252 are supported by cross members 251 and are parallel to the sides of the collector plate frame 247 and to each other. A plurality of freely revolving wheels 253, preferably similar to roller skate wheels, capable of free and easy rotation, are supported by shafts 252. These wheels are evenly distributed to substantially fill the area bounded by collector plate frame 247. The shafts 252 are positioned to place the upper edge of wheels 253 to extend slightly above the top edge of the collector plate frame 247 and cross members 251 of same.

A pair of perpendicular supports 254 and 255 are secured to the upper face of the top rectangular member 204 and are positioned approximately above the center dividing upright members 203. These supports are provided with holes 259 and 260 drilled parallel to the direction of travel of collector plate 246. A pair of shafts 257 and 258 are mounted for sliding movement within the holes 259 and 260. Shafts 257 and 258 support a wiper bar 256 and are rigidly attached to the wiper bar by welding, brazing, threading, etc. The position of wiper bar 256 may be adjusted by sliding shafts 257 and 258 in and out of holes 259 and 260. The shafts are locked in position by set screws 261 or other similar holding devices. It should be here noted that the holes 259 and 260 in supports 254 and 255 are positioned to allow the lower edge of wiper bar 256 to clear the top of the roller wheels 253.

The side of rectangular top member 204, opposite to the one over which the articles from the feed conveyor 273 must travel to reach the collector plate 246, is also provided with a pair of perpendicularly projecting members 262 and 263, located at any convenient point on the forward side portion of the top rectangular member 204 which lies forward of the central supporting member 203. These projecting members are bored with holes 264 and 265 and are perpendicular to the direction of travel of collector plate 246. A keeper bar 268 is secured to a pair of shafts 266 and 267 that are mounted for sliding movement within the holes 264 and 265. These holes 264 and 265 are located to permit the lower edge of keeper bar 268 to clear the tops of roller wheels 253. The position of keeper bar 268 in normal operation is such that it will be at or close to the side of collector plate 246.

A normally open switch LS-6 is preferably mounted on keeper bar 268 near its rear end corresponding to the zone at which the cartons enter the collector plate 246, on the side of the keeper bar facing side 241 of top member 204. A plurality of normally open switches, four by way of example, numbered LS-2, LS-3, LS-4, LS-5 are secured above collector plate 246 and are positioned immediately in front of the above wiper bar 256. The switch levers extend down to a position slightly above the roller wheels 253 so that the switches become closed each time an article passes beneath them.

A normally open switch LS-10, provided with a swinging lever arm 269, is preferably located near the forward end of keeper bar 268. Swinging lever arm 269 is normally positioned above collector plate 246 so that a package or article passing under the switch will cause the lever arm to move closing the circuit.

The vertical member 239 nearest to side 241 of collector plate frame 247 is provided with a normally open switch LS-1 which is located close to, but not on end 272 of the top member 204 and is closed when the side of said collector plate frame 247 strikes it.

A normally open switch LS-7 is preferably centrally positioned on the inner side of end 271 where it will be contacted by the forward end of collector plate frame 247 at the end of its forward travel.

A normally closed switch LS-8 and a normally open switch LS-9 are secured to end 272 of the top rectangular member 204 in a position where the rearward end of the frame 247 of the collector plate 246 will strike them opening the switch LS-8 and closing the switch LS-9 when it has reached the end of its rearward travel.

Figure 6:
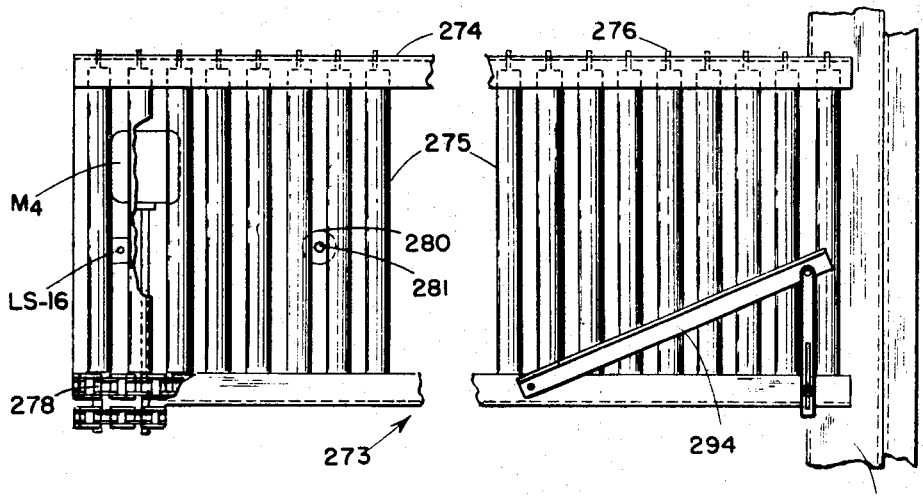
Fig. 6 is a top plan view partly cut away of the feed conveyor.
Figure 7:
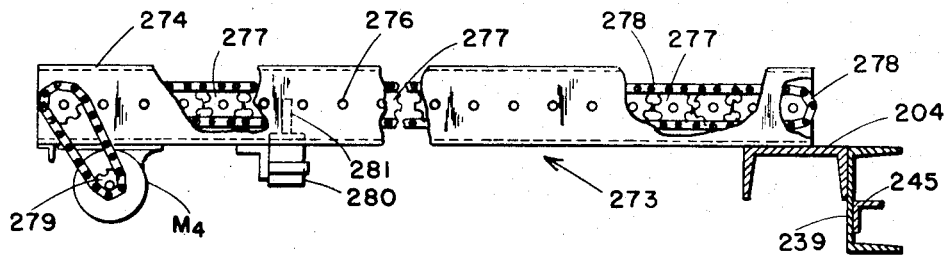
Fig. 7 is a side elevational view partly cut away of the feed conveyor.

The feed conveyor 273, transports articles such as cartons or other rectangular objects from the end of an assembly line (not shown) to the collector plate 246. This feed conveyor comprises a rectangular frame 274 which supports a plurality of cylindrical rollers 275 mounted on shafts 276. These shafts 276 are placed perpendicular to the long side of the frame 274 and parallel to each other. Bearings may be used on each end of shafts 276, if desired, and are secured to the frame 274 at uniform intervals. A corresponding number of sprockets 277 are secured to one end of each shaft and are linked together by an endless chain 278 such as shown in Figs. 6 and 7. A motor $M_4$ is secured to the lower side of rectangular frame 274 and is provided with a sprocket 279. The chain 278 is driven by the sprocket 279.

A pair of guides 293 and 294, the latter being adjustable, are attached to the upper edge of the frame 274 and serve to guide the articles traveling down the conveyor so that they will be discharged onto the collector plate 246 at the proper zone.

A solenoid 280 having a plunger 281 is secured to the lower side of the frame 274 below rollers 275. The top of plunger 281 is normally below the tops of these rollers 275 and extends above the tops of such rollers only when the solenoid 280 is energized. Figs. 1 and 6 show the solenoid 280 and its plunger 281 in their preferred position.

Figure 5:
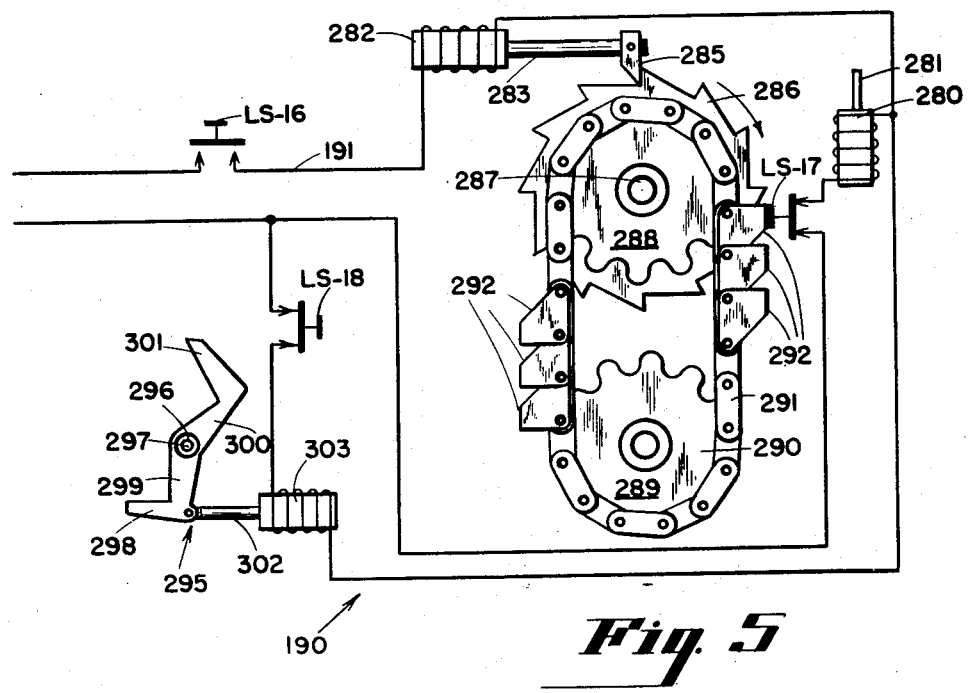
Fig. 5 is a partly schematic view of the mechanism and wiring to operate the pallet supports and locking device in the rear compartment including the mechanism for operating an article orienting solenoid on the feed conveyor.

A normally open switch LS-16 is positioned near the entrance end of the feed conveyor 273 between a pair of the aforesaid rollers 275, said switch having the article contacting member thereof extending slightly above the top of the rollers. Each article coming onto the conveyor passes over said article contacting member and closes the switch while in contact with it. A second solenoid 282 in Fig. 5 is energized each time switch LS-16 is closed, and a plunger 283 of the solenoid 282 is extended outwardly each time the circuit is closed. Plunger 283 retracts every time solenoid 282 is deenergized. The end of plunger 283 is provided with a pawl 285 which acts against a ratchet wheel 286 mounted on a shaft 287. This assembly or counter device may be located at any convenient position and need not be on the main device. As shown in the drawings it is connected to the electrical system and is generally numbered 190.

A sprocket 288 of the counter device 190 is mounted and integrally secured to the ratchet wheel 286 either by riveting, bolting, welding, etc., or it may be mounted on the end of shaft 287 in which case both sprocket wheel 288 and ratchet wheel 286 are keyed, splined, or otherwise attached to shaft 287 to maintain them in fixed relationship. A second sprocket 289 of said counter device is mounted on a second shaft 290 which is supported in any desired manner. Sprocket 289 is positioned to correspond to sprocket 288. An endless chain 291 passes over sprockets 288 and 289. The preferred arrangement is such that the teeth of the ratchet wheel 286 and the links of chain 291 are mathematically integrated so that one tooth turn of ratchet wheel 286 will move one link of the chain past any given point.

Chain 291 is provided with a plurality of lugs 292 which may be distributed on the chain in any predetermined arrangement. A normally open switch LS–17 is positioned so that the lugs 292 will strike against it when they come into position causing it to close. When this occurs solenoid 280, located on the feed conveyor 273, becomes energized causing its plunger 281 to extend above the top of the rollers 275.

A plurality of empty pallet supporting members 295, roughly M-shaped, are provided in the rearward compartment 206 and preferably near the four corners. These are positioned a sufficient distance above the top of plates 234 to permit them to clear any pallet lying upon the upper surfaces of plates 234.

Each supporting member 295 is provided with a centrally positioned bearing hole 296 that slides over a supporting axle 297.

Each supporting member 295 is also provided with a pallet support arm 298 normally disposed in perpendicular relation to a central lower portion 299, which is permanently secured thereto or made an integral part of it. A central upper portion 300 of said supporting member 295 is connected to said lower portion 299 in such a manner that its longitudinal axis forms an obtuse angle with the longitudinal axis passing through the portion 299. An upper holding portion 301 is attached to the portion 300 preferably at right angles to its axis. The angle between the axes of central portions 299 and 300 should be sufficient to permit the free end of holding arm 301 to clear the edge of the pallets resting on supporting arm 298.

Figure 2:
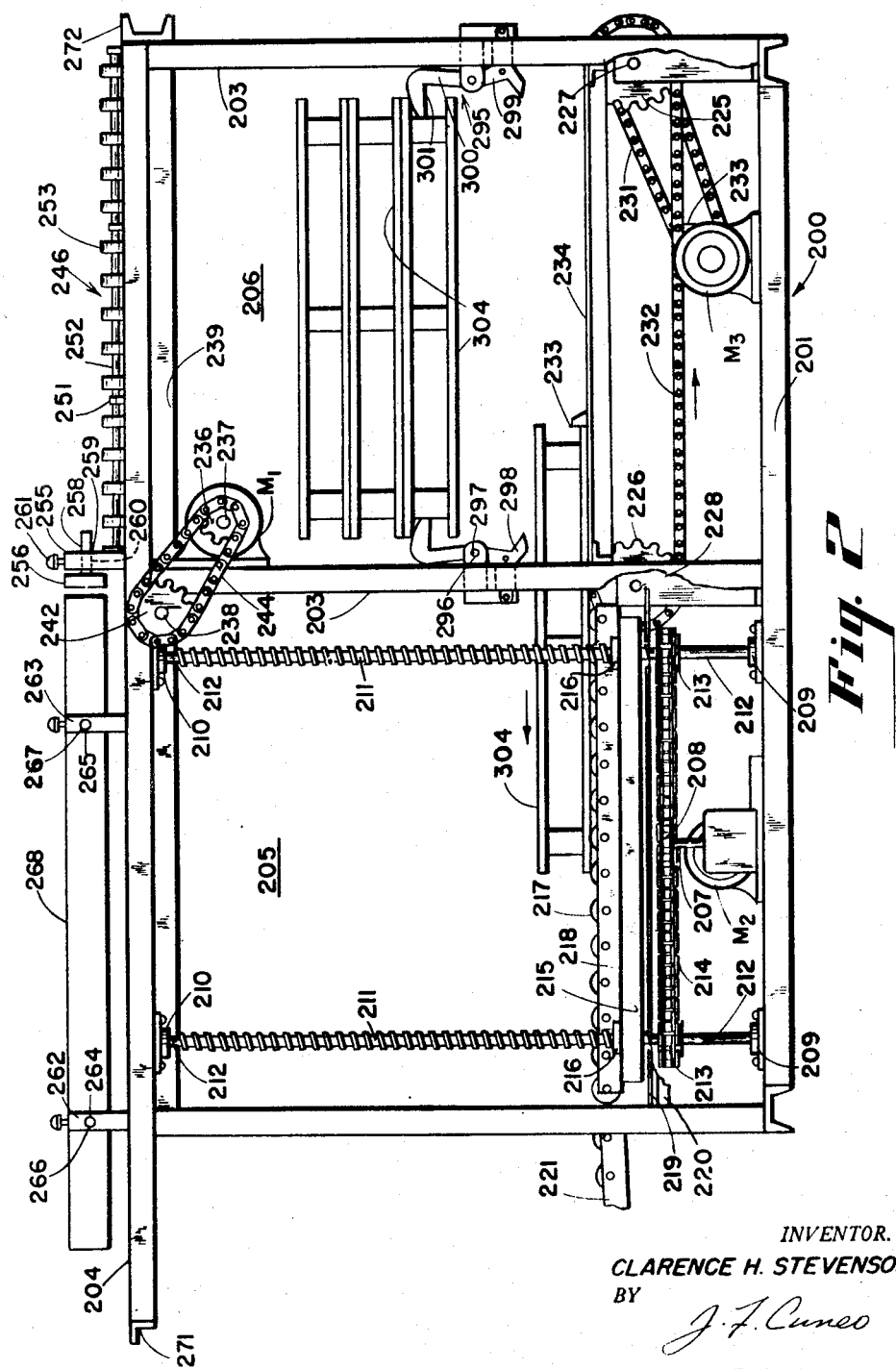
Fig. 2 is a side elevation view of the device showing a pallet being transferred from the rearward compartment to the forward compartment.

A plunger 302 is attached to lower arm 299 of each M-shaped supporting member 295 and is positioned within a solenoid 303. Each plunger 302 causes its M-shaped supporting member 295 to pivot on its axle 297 each time said solenoid 303 is energized. Solenoid 303 may be pivotally supported as in Fig. 2.

A plurality of empty pallets 304 are stacked on supporting arms 298 of M-shaped supporting members 295 and are normally held a sufficient distance above plates 234 to permit a pallet to slide under them freely. When the circuit through switch LS–18 is closed the solenoids 303 are energized and the plungers 302 are extended. This action rocks the pallet supports 295 causing holding arm supports 301 to engage the pallet above the lowest one of the stacks. The arms 298 are then tilted up sufficiently to allow the lowest pallet to slip off onto plates 234. The solenoids 303 will continue to remain energized as long as the dropped pallet is being pushed by lugs 233 into the forward compartment. As soon as the solenoids 303 are deenergized the plungers 302 thereof will return to their normal position and the stack of empty pallets will fall on the arms 298.

In some instances it may be desirable to employ the top portion of the device such as the feed conveyor 273 and collector plate 246 alone without the elevator mechanism. In such cases the collector plate 246 would wipe off the articles arranged upon it onto any level surface immediately below it such as a flat plate that could be carried away from the machine when loaded. The collector plate 246 could also be made to discharge onto a conveyor belt or other transfer means which could be actuated by the same motor and switches that are used in causing the pallet lift platform 215 to lower each time a layer is deposited upon it from the collector plate 246. If a conveyor or other transfer means is employed that ordinarily travel in one direction only motor $M_2$ may be a non-reversing type of motor which would drive the conveyor directly eliminating lead screws 211.

ELECTRICAL ASSEMBLY

The method in which the various electrical units are integrated is as follows: To simplify description one of the wires shall hereafter be referred to as positive and the other wire as the negative wire or ground wire, even though alternating current may be used to supply energy to the device.

Electrical energy is supplied from a source by a positive wire 25 and returns through a negative or ground wire 28.

The normally open switches LS–2, LS–3, LS–4, and LS–5 are connected in series to each other and are located in a wire 24, between positive wire 25 and a relay $K_1$. The circuit is completed through the coil of relay $K_1$ by a wire 27 that makes connection with the negative wire 28. A second wire 35 also connects the positive wire 25 to relay $K_1$ joining wire 24 at a junction point 36. The normally open switch LS–1 is located in wire 35 between positive wire 25 and junction point 36.

Relay $K_1$ opens and closes three pairs of contact points 29—30, 31—32, and 33—34. Points 29—30 and points 33—34 are normally open and points 31—32 are normally closed.

A second relay $K_2$ and a time delay relay $K_3$ are connected in parallel through a wire 44. A wire 45 connects wire 44 to positive wire 25 at a junction point 46. The normally open switch LS–7 is located in wire 45 between positive wire 25 and junction point 46. Circuit for the coils of relays $K_2$ and $K_3$ is completed by wires 48 and 49 respectively, which connect the coils of the relays to the negative wire 28.

Relay $K_2$ operates five pairs of contact 50—51, 52—53, 54—55, 56—57 and 58—59. Points 50—51, 54—55, 56—57, 58—59 are normally closed, and points 52—53 are normally open. Time delay relay $K_3$ operates three pairs of contact points 60—61, 62—63, 64—65, all of these points are normally open.

The coil of the fourth relay $K_4$ is energized by positive wire 25 through a wire 67. The normally open switches LS–9 and LS–10 are placed in series with each other in wire 67. The normally open switch LS–11 is connected in parallel with switch LS–10 and in series with switch LS–9 and is in turn connected to wire 67 at a junction point 71 which is located between switches LS–9 and LS–10 and a junction point 72 located between switches LS–10, LS–11 and relay $K_4$. The circuit is completed through the coil of relay $K_4$ by a wire 73 which connects to the negative wire 28.

Relay $K_4$ operates three pairs of contact points 74—75, 76—77 and 78—79. Contact points 74—75 and contact points 76—77 are normally closed and contact points 78—79 are normally open.

A fifth relay $K_5$ is connected to positive wire 25 through a wire 81. The normally open switch LS–12 is located in wire 81 between relay $K_5$ and the positive wire 25. The circuit through the coil of relay $K_5$ is completed by a wire 97 which connects to negative wire 28. Relay $K_5$ operates seven pairs of contact points 83—84, 85—86, 87—88, 89—90, 91—92, 93—94 and 95—96. Contact points 83—84, 85—86 are normally closed and contact points 87—88, 89—90, 91—92, 93—94, 95—96 are normally open.

A sixth relay $K_6$ is connected to a wire 100 and makes connection with wire 81 at a junction point 99. The normally open switch LS–14 is located in wire 100 between junction point 99 and relay $K_6$. The circuit is completed through the coil of relay $K_6$ by a wire 102 connecting relay $K_6$ to ground wire 28.

Relay $K_6$ operates three pairs of contact points 103—104, 105—106, 107—108. Contact points 103—104 are normally closed while contact points 105—106, 107—108 are normally open.

Connections to the various points of relays will for convenience be discussed in groups comprising the points operated by each individual relay, and will be considered under the heading of each separate relay.

RELAY K₁

Point 29 of relay K₁ is connected by a wire 40 to positive wire 25. The normally open switch LS-6 is located in wire 40 between the positive wire 25 and contact point 29. Contact point 30, which is paired with contact point 29, is connected by a wire 39 to line 24 at a junction point 38 located between junction point 36 and the coil of relay K₁.

Contact point 31 is connected by a wire 109 to contact point 50 of relay K₂. Contact point 32 which is paired with contact point 31 is connected directly to positive wire 25 through a wire 110.

Contact point 33 is connected by a wire 111 to contact point 54 of relay K₂. Contact point 34 which is paired with contact point 33 is connected by a wire 112 to a terminal 113 of motor M₁, the other terminal 115a of motor M₁ is connected to ground wire 28 directly by a wire 116.

A solenoid brake 117 which acts upon the armature of motor M₁ is connected in parallel to terminals 113 and 115a of motor M₁ by wires 114 and 115 through junction points 132 and 118. The brake clamps down on the shaft whenever the motor is deenergized and releases the armature when the motor is energized.

RELAY K₂

As stated above contact point 50 of relay K₂ is connected to contact point 31 of relay K₁ by wire 109. Contact point 51 which is paired with contact point 50, is connected directly to one terminal 184 of motor M₄ by a wire 119.

Contact point 52 of the second pair of points is connected to positive wire 25 by the wire 120 through a normally closed switch LS-8. Contact point 53, which is paired with contact point 52, joins wire 44 at a junction point 122 through a connecting wire 123.

Contact point 54 of the third pair of points operated by relay K₂ is connected as stated above to contact point 33 of relay K₁ by wire 111. The corresponding contact point 55, which is paired with point 54, is connected to contact points 61, 77 and 88 by wires 124, 138 and 156 respectively.

Contact point 56 is connected to contact point 64 of relay K₃ by a wire 125. A wire 127 connects the field terminal 128 of motor M₁ to wire 125 at a convenient junction point 129. Contact point 57, which is paired with contact point 56 is connected to contact point 75 by a wire 126 and to contact point 63 through a wire 140 and a junction point 141.

A wire 130 connects wire 126 at a junction point 131 to wire 114 at junction point 132. Contact point 58 of the fifth pair of contact points is connected by a wire 133 to contact point 62 of relay K₃. A wire 134 connects wire 133 to the other field terminal 136 of motor M₁ making connection at a junction point 135. Contact point 59, which is paired with contact point 58 is connected to wire 116 by a wire 137 at a junction point 169.

RELAY K₃

Contact point 60 of the first pair of contact points operated by relay K₃ is connected to contact point 74 operated by relay K₄ by a wire 66. Contact point 61, which is paired with contact point 60, is connected by a wire 138 to wire 124 a the junction point at 139.

As previously described contact point 62 of the second pair of contact points of relay K₃ is connected to contact point 58 of relay K₂ through wire 133. Contact point 63 which is paired with contact point 62 is connected by the wire 140 to wire 126 at junction point 141.

The contact point 64 of the third pair of contact points, operated by relay K₃ has previously been described as connected to contact point 56 of relay K₂ by wire 125 and also by wire 127 to terminal 128 of motor M₁. Contact point 65 which is paired with contact point 64 is joined to wire 137 by a wire 142 through a junction point 143.

RELAY K₄

Contact point 74 of the first pair of contact points operated by relay K₄ has been previously described as connected to contact point 60 operated by relay K₃ and contact point 75 paired with contact point 74 has been described as connected to contact point 57 operated by relay K₂, respectively. Contact point 75 is also connected to wire 130 at junction point 131.

Contact point 76, of the second pair of contact points operated by relay K₄, is connected directly to the positive wire 25 by a wire 144 through a junction point 145. Contact point 77, which is paired with contact point 76, which has been previously described, is connected to contact points 55, 61, and 88.

Contact point 78 of the third pair of contact points operated by relay K₄ is connected to wire 144 at junction 145 thereby coupling point 78 directly to positive wire 25. Contact point 79, which is paired with contact point 78, is connected by a wire 146 to contact point 103 operated by relay K₆.

RELAY K₅

Contact point 83 of the first pair of contact points of relay K₅ is connected to one terminal 147 of the motor M₂ by a wire 148. The other terminal 172 of motor M₂ is connected by a wire 173 to ground wire 28. A solenoid brake 174 is connected in parallel between wire 148 and wire 173 at junction points 175 and 176, respectively, and quickly stops rotation of the motor armature when the motor is deenergized. Contact point 84, which is paired with point 83, is connected to a field terminal 149 of motor M₂ by a wire 150.

Point 85 of the second pair of contact points operated by relay K₅ is connected to the other field terminal 151 of motor M₂ by a wire 152 which joins a second wire 159 at a junction point 160. Contact point 86, which is paired with contact point 85, is connected to the negative wire 28 through a wire 153, a junction point 164, and a wire 163.

Contact point 87 of the third pair of contact points operated by relay K₅ is connected by a wire 154 at a junction point 166.

Wire 154 joins positive wire 25. Contact point 88, which is paired with point 87, is connected by a wire 156 to wire 124 at a junction point 155.

Contact point 89 of the fourth pair of contact points operated by relay K₅ is connected by a wire 157 to wire 148 at a junction point 158. Contact point 90, paired with contact point 89, is connected to wire 152 at the junction point 160.

Contact point 91 of the fifth pair of contact points operated by relay K₅ is connected by a wire 161 to wire 150 at a junction point 162. Contact point 92, paired with contact point 91, is connected by the wire 163 to negative wire 28.

Contact point 93 of the sixth pair of contact points operated by relay K₅ is connected by a wire 165 to wire 154 at junction point 166. Wire 154 connects directly to positive wire 25. Contact point 94, which is paired with contact point 93, is connected by a wire 167 to wire 67 at junction point 72.

Contact point 95 of the seventh pair of contact points operated by relay K₅ is connected to positive wire 25 by a wire 168. A normally closed switch LS-13 is located in wire 168 between contact point 95 and positive wire 25. Contact point 96, which is paired with contact point 95, is connected to wire 81 by a wire 171 joining wire 81 at a junction point 170.

RELAY K₆

This relay is provided with three pairs of contact points. Contact point 103 of the first pair of contact points operated by relay K₆, is connected to contact point 79 of relay K₄ by wire 146. Contact point 104, which is paired with contact point 103, is connected by a wire 193 to wire 148 leading to the terminal of motor M₂ at a junction point 177.

Contact point 105 of the second pair of contact points operated by relay K₆ is connected directly to positive wire 25 by a wire 178. Contact point 106 which is paired with contact point 105 is connected to one terminal 179 of the motor M₃ by a wire 180. The other terminal 182 of motor M₃ is connected to the negative wire 28 by a return wire 181.

Contact point 107 of the third pair of contact points operated by relay K₆ is connected to positive wire 25 by a wire 183. A normally open switch LS-15 is located in wire 183 between positive wire 25 and relay contact point 107. Contact point 108, which is paired with contact point 107, is connected through a wire 185 to wire 100, at a junction point 186, and energizes the coil of relay K₆.

The remainder of the circuit comprises the counter device 190, more completely shown in Fig. 5, and more completely described in the mechanical device. The terminals of counter device 190 are connected to positive wire 25 through wires 191 and 194. The counter device 190 is connected to negative wire 28 through a wire 192. The normally open switch LS–16 is located in wire 191 between positive wire 25 and counter device 190. Wire 194 connects the counter device 190 to the positive wire 25 directly.

A terminal 184 of motor M4 is connected to the contact point 51 of relay K2 by wire 119, described above, and thence to positive wire 25. A terminal 198 of motor M4 is connected to ground wire 192 by a wire 199 at a junction point 195, thus making connection with negative wire 28.

A main line switch 196 and a fuse 197 may be placed in series with the main positive wire 25 at any convenient point outside of the above-described circuit.

OPERATION OF THE DEVICE

The respective components of the device are assembled as shown in Fig. 1 and the switches are located as shown in Figs. 5, 8 and 9. The electrical elements are connected together as shown in Fig. 9. The operation of the device is as follows: At the beginning of the cycle the collector plate 246 is in the position as shown in Fig. 1, however the pallet supporting platform 215 must be raised to its uppermost position instead of the intermediate position in which it is shown in Fig. 1 before the operation cycle can commence. The platform was positioned as shown in Fig. 1 to permit a clearer view of the various component parts of the device.

The articles such as rectangular cartons coming off the assembly line reach the feed conveyor 273. Conveyor 273 is attached to the top member 204 at a position where it will discharge the articles onto the collector plate 246. The rollers 275 of the conveyor are driven simultaneously by Motor M4, sprockets 277 and chain 278. An article discharged onto the feed conveyor will continue to move until it is free of the last rotating roller thereof and will be resting on collector plate wheels 253.

To facilitate understanding the operations of the device the various steps will be grouped under their respective headings and each heading will be considered in detail.

OPERATION I

*Collector plate loading operation*

An article or carton reaching collector plate 246 from feed conveyor 273 is discharged onto the freely rotating rollers 253, which rows of rollers, as hereinbefore described, have their longitudinal axes supported perpendicular to the direction from which the articles are approaching from conveyor 273 and are assembled parallel to each other. This permits the freely rotating wheels 253 to revolve in the same direction as rollers 275 of the conveyor.

The first article such as a carton delivered by conveyor 273 onto collector plate 246 will be discharged so as to rest against the lever of open switch LS–2 closing the switch. The next article coming off the conveyor 273 will advance the first article on the rollers 253 and will displace the first article. The second article will now keep switch LS–2 closed.

The switch LS–3 located in the same transverse plane as switch LS–2, also has a lever which projects a sufficient distance into the path of the advancing articles. As the first article is displaced it comes in contact with such lever of switch LS–3 closing this switch.

Switches LS–4 and LS–5 also provided with levers that are positioned in the same general plane passing through the levers of switches LS–2 and LS–3, are positioned to be closed when the third and fourth articles are discharged onto collector plate 246. The number of these switches is dependent upon the number of articles required to fill a complete row, and may be varied as required.

When a complete row has been deposited the last article deposited on the collector plate 246 will advance the first article against keeper bar 268. The open switch LS–6 is preferably located on keeper bar 268, as previously described herein, with the lever thereof positioned to be contacted by the first carton, of each row of cartons, when it is pushed against the keeper bar. At this time all of the normally open switches LS–2, LS–3, LS–4, LS–5 and LS–6 will be closed and keeper bar 268 will prevent any articles from being pushed off the collector plate 246. Switch LS–6 may also be located at any other position provided it will become closed by the first article of a complete row when the last article of said row is deposited on the collector plate 246.

When the switches LS–2, LS–3, LS–4, LS–5 and LS–6 are all closed, relay K1 becomes energized and closes contact points 29—30, 33—34 and opens contact points 31—32 that are operated by this relay. The opening of contact points 31—32 breaks the circuit to the conveyor motor M4 stopping rollers 275 and also the progress of any articles on the feed conveyor 273. The closing of the contact points 33—34 completes the circuit to the collector plate 246 drive motor M1, through normally closed contact points 54—55 of relay K2 and normally closed contact points 76—77 of relay K4. This starts motor M1 and drives the collector plate 246 forward advancing the first row of deposited articles in the direction of the arrow as shown in Fig. 1. The forward advance of the collector plate and articles releases the levers of switches LS–2, LS–3, LS–4 and LS–5 causing the switches to open. Relay K1 would normally become deenergized at this time, however, this does not occur because the lever of switch LS–6 is still closed by the first article in the row and the circuit to relay K1 is still complete through holding contact points 29—30 which were previously closed allowing current to flow from line 25 to relay K1 through wire 40 and switch LS–6. When the first article or carton has advanced sufficiently to free the lever of switch LS–6, the circuit is broken and relay K1 becomes deenergized. This stops collector plate drive motor M1 and all contact points operated by relay K1 are returned to their normal position. It is apparent that the physical positioning of the lever of switch LS–6 determines the distance collector plate 246 will advance before the motor M1 is stopped.

As soon as the circuit of the motor M1 is interrupted, in the manner above described, the solenoid brake 117 becomes deenergized and clamps down on the shaft of motor M1 immediately stopping its rotation.

The deenergizing of relay K1 reestablishes the circuit through contact points 31—32 and permits feed conveyor motor M4 to start moving more articles onto the collector plate 246. The process of depositing a new row of articles onto the collector plate commences and takes place in the same manner as before. Switches LS–2, LS–3, LS–4, LS–5 and LS–6 again become closed in the manner described above, then relay K1 is again energized stopping motor M4. and starting motor M1. The remainder of the operation takes place in the manner previously described and the collector plate 246 is again advanced sufficiently to bring another zone in alignment so that a third row of articles can be added.

The above operations are all repeated until a complete layer of articles has been deposited onto the collector plate 246 substantially filling its surface.

When the last row of articles has been loaded onto the collector plate 246, the first row of articles deposited on the collector plate will have closed the switch LS–10, which as hereinbefore pointed out is preferably mounted on the forward end of keeper bar 268. Switch LS–10 is connected in series with the normally open switch LS–9, therefore, no circuit is completed until the switch LS–9 is closed and the closing of the switch LS–10 at this time produces no results.

After the last row of the layer has been loaded on the collector plate 246 and switches LS–2, LS–3, LS–4, LS–5, LS–6 and LS–10 are all closed, the collector plate will again move forward as described before. However, before the first article of the last row loaded onto the platform clears switch LS–6 as heretofore the collector plate 246 will have reached the extreme forward point of travel and the forward end of collector plate 246 will contact the lever of normally open switch LS–7 closing the switch. This energizes relay K2 and the time delay relay K3 through wires 45 and 44.

The reason for having switches LS–2, LS–3, LS–4 and LS–5 in series with each other is to prevent a single article from sliding across the width of the collector plate 246 and energizing relay K1 and thus prematurely starting motor M1. This arrangement of switches makes it certain that a completed row of articles is on the collector plate before relay K1 is energized and motor M1 is placed in operation.

OPERATION II

Collector plate discharging operation

At the time the coil of relay $K_2$ becomes energized, contact points 50—51, 54—55, 56—57, and 58—59 are opened and the normally open contact points 52—53 are closed. Contact points 54—55 break the circuit to motor $M_1$ when they are opened stopping the forward travel of the collector plate 246. Likewise the circuit through motor $M_4$ is broken when contact points 50—51 are opened. This prevents motor $M_4$ from starting again even though relay $K_1$ should become unintentionally deenergized, therefore, the feed conveyor 273 will not operate at this time. Contact points 52—53 being normally closed serve as holding contacts keeping relay $K_2$ energized.

Contact points 56—57 and 58—59 having been opened, the circuit to the field terminals 128 and 136 of motor $M_1$ is interrupted.

Time delay relay $K_3$, which has been energized with relay $K_2$, acts after a few seconds delay and contact points 60—61, 62—63, 64—65 all become closed. Since the closing of the contact points operated by relay $K_3$ does not occur at the same instant that relay $K_2$ becomes energized sufficient time elapses to permit the already disconnected motor $M_1$ to reach a full stop.

The closing of contact points 62—63, 64—65 by time delay relay $K_3$ then reverses the field terminals 128 and 136 of motor $M_1$ through lines 134 and 127 while the closing of contact points 60—61 again completes the circuit to motor $M_1$ through contact points 74—75, 76—77 of relay $K_4$ which are normally closed. Electricity is now supplied to terminal 113 of motor $M_1$ through wire 130 instead of wire 112. This reverses the field and the rotation of the motor $M_1$. Motor $M_1$ now rotates in the opposite direction to that which it was rotating previously. This causes collector plate 246 to move in the opposite direction from that indicated by the arrow. The instant that said collector plate 246 starts backwards the lever of switch LS-7 is released and would normally interrupt the circuit to relays $K_2$ and $K_3$ and motor $M_1$, however, relays $K_2$ and $K_3$ continue to be energized by current flowing through the holding contact points 52—53 and normally closed switch LS-8. The reverse travel of collector plate 246 would reverse the direction of travel of the articles. However the articles are prevented from following the collector plate 246 because the wiper bar 256, hereinbefore described, holds the articles, while said collector plate is drawn out from under the articles as it continues to recede to the opposite or rearward end of the device. As the articles are progressively cleared off the collector plate 246, they drop a few inches onto an empty pallet 304 located immediately below the collector plate. The empty pallet 304 on which the articles are deposited is resting on pallet lift platform 215 preferably provided with rollers 217. The pallet 304 is positioned immediately below the space occupied by the fully loaded collector plate 246. The collector plate 246 will have discharged the entire layer of the articles onto the pallet 304 when fully retracted. While being retracted the collector plate 246 contacts the lever of the normally open switch LS-1 closing it. The collector plate 246 then continues to travel to its extreme rearward position where it will contact the lever of the normally closed switch LS-8 opening it and also contacts the lever of the normally open switch LS-9 closing it. These switches LS-8 and LS-9 are preferably positioned on the inner face of the rear end portion of the top member 204.

The closing of switch LS-1 occurs slightly before the time when switch LS-8 is opened. Closing of switch LS-1 energizes relay $K_1$, however, this has no effect on the rotation of motor $M_1$ at this time because the relay $K_2$ is still energized and contact points 54—55 are still open. The opening of switch LS-8, however, breaks the circuit through the holding contact points 52—53 of relay $K_2$ and deenergizes relays $K_2$ and $K_3$ stopping motor $M_1$.

OPERATION III

Pallet platform lowering operation

When collector plate 246 reaches the rearmost point of travel, it also contacts, as above described, the lever of normally open switch LS-9 closing the switch. As mentioned in Operation I, the normally open switch LS-10 is closed when the first layer is completed and remains closed through all of Operation II since the articles do not drop enough when transferred to the pallet 304 to allow it to open. The closing of switch LS-9, as well as switch LS-10, now energizes the relay $K_4$. When relay $K_4$ is energized the normally closed contact points 74—75, 76—77 are opened and the normally open contact points 78—79 are closed. The closing of contact points 78—79 completes the circuit through the normally closed contact points 103—104 of relay $K_6$, which are in series with the terminal 147 of motor $M_2$. Motor $M_2$ will then rotate driving sprockets 208, chain 214 and sprockets 213 in a direction to cause lead screws 211 to lower platform 215, all lead screws 211 rotating simultaneously and equally. The pallet lift platform 215 is lowered until the tops of the articles in the first layer deposited on the pallet 304 have dropped sufficiently to permit switch LS-10 to open. The opening of switch LS-10 breaks the circuit to relay $K_4$ deenergizing same and causing contact points 78—79 to open. The opening of contact points 78—79 causes the motor $M_2$, aided by solenoid brake 174, to stop immediately. From the above description it is seen that the positioning of switch LS-10 controls the extent of the downward vertical movement of pallet platform 215 and should always be such that the platform will drop the height of one layer of articles.

During the time that the downward movement of the pallet lift platform 215 is taking place the relay $K_4$ remains energized and contact points 76—77, as well as contact points 74—75, will remain open. This prevents current from flowing to motor $M_1$, even though switch LS-1 is closed and relay $K_1$ is energized.

When the loaded articles have lowered sufficiently to permit switch LS-10 to open, relay $K_4$ becomes deenergized and since switch LS-1 is still closed, and relay $K_1$ is energized, the circuit to terminal 113 of motor $M_1$ is completed through the normally closed contact points of 76—77 of relay $K_4$ and motor $M_1$ will run again. Since switch LS-8 at this time is still open, and the relays $K_2$ and $K_3$ have been deenergized, current flows to the field terminals 128 and 136 of motor $M_1$ in the manner described in Operation I, hence the collector plate 246 moves forward again in the direction of the arrow. The forward end of said collector plate then will pass over the last row added to the first layer of loaded articles deposited on the pallet 304.

The forward motion of collector plate 246 continues until it clears switch LS-1, allowing the latter to open and deenergize relay $K_1$. When relay $K_1$ is deenergized contact points 33—34 are opened breaking the circuit to the motor $M_1$. This permits the collector plate 246 to stop in the proper position so that it may again become loaded as in Operation I.

As stated above contact points 31—32 close when relay $K_1$ becomes deenergized permitting current to again flow to the terminal 184 of motor $M_4$ starting the feed conveyor 273 operating again. The layer loading Operation I, and the subsequent deposition of loaded layers, as described in Operations II and III are repeated until a fully loaded pallet is obtained.

OPERATION IV

Loaded pallet discharging operation

When the last layer has been wiped from collector plate 246 onto the loaded pallet 304 and the collector plate has returned to its extreme rearward position switches LS-1 and LS-9 are again closed and switch LS-8 again opened. Since switch LS-10 is held closed by the articles, the downward movement of the pallet lift platform 215 occurs again as in Operation III. At this time, however, the pallet lift platform 215 contacts the lever of normally open switch LS-11 which is connected in parallel to switch LS-10, thus closing switch LS-11. The closing of switch LS-11 permits relay $K_4$ to remain energized even after the articles have dropped a distance sufficient to permit switch LS-10 to open. This would normally stop the downward movement of the pallet lift platform 215, but since switch LS-11 remains closed the downward movement of the pallet lift platform 215 continues until the platform strikes the lever of the normally open switch LS-12 which is then closed. The lever of the normally open switch LS-14 is also positioned below the pallet lift platform 215 and the switch LS-14 is constructed so that it will close only when the weight of a fully loaded pallet 304 rests upon it. At this point in the operation the collector plate 246 will move forward to its first starting position in the cycle as described in the beginning of Operation I, even though switch LS-11 remains closed. This occurs because relay K₅ is now energized due to the fact that switch LS-12 is closed and current will flow through the contact points 87—88 to terminal 128 of motor M₁. The collector plate loading operation takes place in the same manner as described in Operation I. The layer is again fully loaded, and the collector plate 246 advances to its extreme forward position against the forward end of the device, the plate will not start back wiping the articles off until the pallet lift platform 215 has been returned to the uppermost loading position immediately below collector plate 246.

The closing of switch LS-12 energizes relay K₆ with the following results: Contact points 83—84, 85—86, become open and contact points 87—88, 89—90, 91—92, 93—94, 95—96 become closed. As switches LS-12 and LS-14 are connected in series, both of them must be closed before relay K₆ can become energized by the current flowing through wires 100 and 81. The energizing of relay K₆ causes contact points 103—104 to open and contact points 105—106 to become closed. The opening of contact points 103—104 interrupts the circuit to terminal 147 of motor M₂ thus causing motor M₂ to stop and thereby arrest the downward motion of the pallet lift platform 215. Contact points 105—106 now being closed complete the circuit to terminal 179 of motor M₃ through wires 178 and 180 thus causing said motor M₃ to start and effect driving of the chain 231 trained over motor sprocket 224. The driven chain 231 in turn drives the sprocket 229 carried by the shaft 222 which also carries and drives the sprocket 225. The chain 232 trained over the sprocket 225 carries the uniformly spaced pallet advancing lugs 233 thereon. As the chain 232 advances the rearmost lug 233 on the ascending portion of said chain moves up through the gap 235 between the plates 234 and travels parallel to said plates 234.

The instant that the currently rearmost lug 233 starts to move, from its ascending position shown in Figs. 1 and 3, it releases the lever of the normally closed switch LS-18 which was previously open, allowing it to close. This energizes the solenoids 303, one of which is shown in Fig. 5 and retracts the plungers 302 of same causing M-shaped supports 295 to pivot on their axles 297. This withdraws pallet support arms 298 from beneath the bottom pallet 304 of the stack of empty pallets and permits upper holding arms 301 to engage the top of the pallet 304 next or succeeding bottom pallet. The holding arms 301 then supports the stack of pallets and the released pallet having cleared arms 298 drops onto plates 234. The M-shaped member solenoids 303, and plungers 302 thereof are shown mounted to the four uprights at the corners of the rearward compartment by way of example. These may be mounted at any other suitable position and may be supported by other means if desired.

The currently rearmost lug 233 above mentioned continues to advance and eventually engages the rearmost edge of the pallet 304 that has been dropped on plates 234 driving it forward in the direction shown by the arrow and forcing it against the fully loaded pallet resting on the pallet lift platform rollers 217. Since this loaded pallet is free to move on rollers 217 it is shoved off the pallet lift platform 215 as the empty pallet advances and is usually discharged onto a suitable form of a conveyor, preferably a second roller conveyor 221, as shown in Fig. 1. The empty pallet continues to advance into the forward compartment holding the lever of switch LS-15 closed until it reaches the position occupied by the displaced loaded pallet. At this point the empty pallet 304 becomes clear of lug 233, which advanced the same, and comes to rest upon the rollers 217 of pallet lift platform 215 in a loading position. At the same time the empty pallet 304 will release the lever of switch LS-15 breaking the circuit to motor M₃. Meanwhile, the second lug 233 on the chain 232, which has been traveling backward, will upon reaching the limit of its rearward travel and while ascending from the plane of such travel will force open the normally closed switch LS-18 deenergizing the solenoids 303 and returning the M-shaped members to their original position and the stack of pallets 304 will drop one pallet thickness to rest on arms 298.

As the fully loaded pallet moves off of the pallet lift platform 215 the lever of switch LS-14 is released opening the circuit to relay K₆. Relay K₆, however, does not become deenergized at this time because current is still flowing through the holding contact points 107 and 108 which are in series with each other and the normally open switch LS-15 which is still closed. This permits the incoming empty pallet 304 to continue being driven into position until it moves off of switch LS-15 causing it to open deenergizing relay K₆. This will stop the flow of current through the terminals of motor M₃, stopping motor M₃ and arresting the motion of chain 232 and lugs 233.

OPERATION V

*Empty pallet lifting operation*

When relay K₆ becomes deenergized normally closed points 103—104 again close to complete the circuit to the terminal of motor M₂, however, since switch LS-12 is still closed, relay K₅ continues to remain energized causing a reversal of the field terminals 149 and 151 of motor M₂. This makes the motor revolve in the opposite direction and the empty pallet 304 and the pallet lift platform 215 will travel upwards. More explicitly the reversal of the field terminal 149 is caused through contact points 83—84 being open and contact points 89—90 being closed, while field terminal 151 is reversed by contact points 85—86 being open and contact points 91—92 being closed. Meanwhile, the pallet lift platform 215, and empty pallet 304 will continue to move upward allowing switch LS-12 to become open, however, relay K₅, now continues to remain energized through the holding contacts 95—96 which are in series with the normally closed switch LS-13, hence the upward movement of the pallet lift platform 215 will continue until the platform strikes the lever of switch LS-13 opening the circuit and deenergizing relay K₅. When this occurs the pallet lift platform 215 and the empty pallet 304 will have been raised to the uppermost loading position and are ready to receive the first layer of articles or cartons on collector plate 246 which has already been loaded. This operation completes the cycle which is repeated in the manner described above. Every time another pallet has been loaded it is discharged and replaced by an empty pallet.

When it is desired to vary the loading pattern of any given load the orienting device on the feed conveyor 273 is employed. This device, shown in Figs. 1, 5, 6 and 7, operates as follows: The lever of the normally open switch LS-16 is located on conveyor 273, projecting slightly above rollers 275, and closes the circuit each time an article passes over it. When this occurs the solenoid 282 is energized causing its plunger 283 and its pawl 285 to advance ratchet wheel 286 of counter device 190 one tooth. Concurrently therewith, the sprocket wheels 288 and 289 having the sprocket chain 291 trained therearound together with the lugs 292 thereof are all similarly advanced. The instant that the article moves off the switch LS-16 the switch opens, deenergizes the solenoid 282 and causes its plunger 283 to retract. This occurs every time an article traveling down the feed conveyor 273 passes over switch LS-16. When sufficient articles or cartons have passed over the switch LS-16 to advance one of the lugs 292 so that it makes contact with the lever of the normally open switch LS-17, the circuit through the solenoid 280 on conveyor 273 is completed, energizing the solenoid and causing its plunger 281 located between a pair of rollers 275, on the feed conveyor 273, to extend above the tops of the rollers. When the plunger extends above the rollers 275 of the feed conveyor 273 it extends into the path of travel normally assumed by an article traveling down the conveyor 273 from the assembly line. Since the articles are being propelled by the rollers 275 they will come in contact with the obstruction provided by the solenoid plunger 281. If this obstruction strikes the article on one side correctly it will cause the article to be automatically pivoted before it can clear the obstruction offered by the plunger 281 and proceed down the feed conveyor 273. By properly positioning the plunger 281 the carton can be made to turn at any angle up to 90°. In this manner the article, such as a rectangular carton, or the like is then discharged onto the collector plate 246 with its longitudinal axis revolved a predetermined angle from that of the longitudinal axis of the previous article, which passed over the feed conveyor 273 when the plunger 281 was not extended above the top of the rollers 275. By properly positioning of the lugs 292 on the chain 291 and correctly locating plunger 281 any desired or predetermined loading pattern can be automatically obtained.

The pallet loading machine according to my invention will materially decrease the time and cost of loading articles for storage or shipment.

The above description makes it apparent that the machine will eliminate non-uniform loading of pallets providing a better balanced load which will be easier to handle.

The device can be designed to stack a load at any given height making it possible to increase the number of articles moved per load. This in turn will effect a great economy in time, equipment and floor space.

Since no human handling of the articles is necessary at any time it will be just as practical to load large heavy articles as it will be to load light, small articles. This feature eliminates a safety hazard that is always present when cartons or articles are stacked by hand.

The orienting device according to my invention is particularly valuable in cases where pallets are to be loaded at great heights and the load may be subjected to rough handling. The orienting device locks the corners of each article by the other articles thereby insuring a load possessing maximum stability.

The machine is entirely automatic and therefore requires little or no supervision, other than making the necessary adjustments to produce the desired effects and supplying empty pallets to the empty pallet compartment.

While I have shown and described a preferred embodiment of the present invention, it will be understood that various changes and modifications may be made without departing from the spirit of the invention and the scope of the appended claims.

Having thus described the present invention and the manner in which the same is to be used, what I claim as new and desire to protect by Letters Patent is:

1. The combination in an article loading machine comprising feeding means, receiving means provided with a plurality of receiving zones for articles to be stacked, means actuated by the articles to be stacked for selectively advancing said receiving means step by step to bring such receiving zones successively in alignment with said feeding means, a vertically movable platform above which said receiving means is adapted to be disposed when loaded, means for retracting said receiving means to clear the region above said platform, stopping means for holding said articles when said receiving means is retracted and discharging said articles onto said platform, and means to lower said platform.

2. A combination as in claim 1 including means for discharging articles from said vertically movable platform, energizing means actuated by the lowering of said vertically movable platform to actuate said means for discharging articles from said platform.

3. A combination as in claim 1 including a plurality of switch means in series with each other engageable by the articles fed to said receiving means for selectively moving said receiving means.

4. The combination in an article loading device comprising feeding means, track means, receiving means mounted on said track means and provided with a plurality of zones for articles to be stacked, means actuated by the articles to be stacked for selectively advancing said receiving means to bring said zones successively into alignment with said feeder means, a vertically movable platform above which said receiving means is adapted to be disposed when fully loaded, means for retracting said receiving means to clear the region above said platform and to discharge said articles onto said vertically movable platform from said receiving means upon the retracting of said receiving means.

5. The combination according to claim 4 including switch means coming under the control of articles on said receiving means for controlling the lowering movement of said platform.

6. The combination in an article loading device comprising a supporting framework, track means mounted on said framework, feeder means, receiving means mounted on said track means and provided with a plurality of receiving zones for articles to be stacked, stopping means attached to said framework on the side opposite to said feeder means for retaining articles delivered to said receiving means, means actuated by and under the control of articles received by said receiving means for successively advancing said receiving means to bring said zones successively into alignment with said feeder means, a vertically movable platform above which said receiving means is adapted to be disposed when fully loaded, means for retracting said receiving means to clear the region above said platform, and means to discharge said articles onto said vertically moving platform from said receiving means upon retraction of said receiving means.

7. The combination in an article loading device according to claim 6 in which the receiving means comprises a framework provided with a plurality of rollers.

8. The combination in an article loading device according to claim 7 in which the axes of said plurality of rollers is at right angles to the direction of travel of articles coming off said feeder means.

9. The combination in an article loading device according to claim 6 in which the vertically movable platform is provided with a plurality of rollers.

10. The combination in an article loading device according to claim 6 including a roller discharge conveyor, said discharge conveyor aligned to correspond with the rollers on said vertically movable platform.

11. The combination in an article loading device comprising a supporting framework, track means mounted on said framework, feeder means, receiving means mounted on said track means and provided with a plurality of receiving zones for articles to be stacked, stopping means attached to said framework on the side opposite to said feeder means for retaining articles delivered to said receiving means, means actuated by and under the control of articles received by said receiving means for successively advancing said receiving means to bring said zones successively into alignment with said feeder means, transfer means above which said receiver means is adapted to be disposed when fully loaded, means for retracting said receiving means to clear the region above the said transfer means, and means to discharge said articles onto said transfer means from said receiving means upon retracting of said receiving means.

12. A combination as in claim 11 in which a roller discharge conveyor is provided in alignment with said transfer means.

13. The combination in an article loading machine comprising conveyor means for conducting articles to be stacked, a first switch means actuated by said articles passing over said conveyor means, counter means actuated by the closing of said first switch means; a second switch means actuated by said counter means; an orienting means in juxtaposition with said conveyor means, said orienting means comprising an obstruction projected to one side of the center of, and in the path of oncoming articles passing over said conveyor means, said obstruction being actuated by the closing of said second switch means; receiving means provided with a plurality of receiving zones for articles to be stacked; means actuated by, and under the control of, articles delivered to said receiving means by said conveyor means for successively advancing said receiving means step by step to bring each receiving zone successively in alignment with said conveyor means; a vertically movable platform above which said receiving means is adapted to be disposed when loaded; means for retracting said receiving means to clear the region above said platform; arresting means for holding said articles in position when said receiving means is retracted thereby discharging said articles onto said platform, means to lower said platform.

14. The combination in an article loading machine according to claim 13 in which the conveyor means is provided with guide means for establishing the position from which said articles are discharged from said conveyor means.

15. The combination in an article loading machine according to claim 13 in which said conveyor means comprises driven roller means.

16. The combination in an article loading machine according to claim 13 in which the position of said orienting obstruction is adjustable, said obstruction comprising a solenoid actuated plunger actuated by the closing of said second switch means.

17. An article loading device comprising a support, a track attached to said support, article feeding means, article receiving means reciprocable upon said track and provided with a plurality of article receiving zones, motor means actuated by the articles received by each of said zones for selectively advancing said article receiving means step by step to bring said receiving zones successively into alignment with said feeding means, means engageable by said article receiving means at one end of its reciprocation to stop and reverse said motor means, means at the opposite end of its reciprocation to stop and reverse again said motor means for effecting resumption of the controlled advancement zone by zone of said article receiving means, movable platform means, means for transferring articles from said article receiving means to said movable platform means, means for moving said platform means, and means engageable by said article receiving means for activating said platform moving means.

18. An article loading device comprising a support, a track attached to said support, article feeding means, article receiving means reciprocable upon said track and provided with a plurality of article receiving zones, motor means actuated by the articles received by each of said zones for selectively advancing said article receiving means zone by zone a distance substantially equivalent to the size of the articles being handled and delivered to the individual zones to bring the latter successively into alignment with said article feeding means, switch means engageable by said article receiving means at one end of its reciprocation to stop and reverse said motor means for effecting retraction of said article receiving means, a second switch means engageable by said article receiving means at the opposite end of its reciprocation to stop and reverse again said motor means for effecting resumption of the controlled advancement zone by zone of said article receiving means, vertically movable platform means, means for transferring the articles from said article receiving means to said platform means, motor means for activating said vertically movable platform means, and a third switch means engageable by said article receiving means at said opposite end of its reciprocation for energizing said last named motor means to effect vertical movement of said platform means.

19. An article loading device according to claim 18 including a fourth switch means actuated by and under the control of the articles transferred onto said vertically movable platform means for energizing said platform motor means to thereby effect controlled downward movement of said platform means.

20. An article loading device according to claim 19 wherein said movement control third switch means is in series with said fourth switch means controlling said platform means moving motor means.

21. An article loading device according to claim 20 including a fifth switch means engageable by said vertically movable platform means to effect stoppage of said platform moving motor means.

22. An article loading device according to claim 21 including means for ejecting loaded articles from said vertically movable platform means, motor means for actuating said article ejection means, and a sixth switch means actuated by said vertically movable platform means upon reaching the lower end of its travel for energizing said motor means.

23. An article loading device according to claim 22, including a seventh switch means actuated by said article ejecting means at the end of its ejection cycle for effecting stoppage of said ejection actuating motor means.

24. An article loading device according to claim 23, including an eighth switch means engageable by said vertically movable platform means at the lower end of its travel for effecting stoppage of the motor means activating said vertically movable platform means and for reversing connections to said motor means.

25. An article loading device according to claim 18, including a fourth switch means engageable by said vertically movable platform means at the upper end of its travel for effecting stoppage of the motor means activating said platform means and for reversing connections to said motor means.

26. An article loading device comprising a support, a track attached to said support, article feeding means, article receiving means reciprocable upon said track and provided with a plurality of article receiving zones, motor means actuated by the articles delivered to each of said zones for selectively advancing said article receiving means zone by zone a distance substantially equivalent to the size of the articles currently being handled and delivered to the individual zones thereby to bring the latter successively into alignment with said article feeding means, switch means engageable by said article receiving means at one end of its reciprocation for effecting stoppage and reversal of said motor means, a second switch means at the opposite end of its reciprocation for effecting the stoppage and the reversal again of said motor means to permit resumption of the controlled advancement zone by zone of said article receiving means, article transfer means, means for discharging the articles from said article receiving means onto said transfer means, motor means to move said transfer means, and a third switch means engageable by said article receiving means at said opposite end of its reciprocation for energizing said last named motor means to effect movement of said transfer means.

27. An article loading device according to claim 26, including a fourth switch means actuated by and under the control of the articles discharged onto said transfer means for energizing said last named motor means to thereby effect controlled movement of said transfer means.

28. An article loading device according to claim 27, wherein said movement control third switch means is in series with said fourth switch means controlling said transfer means moving motor means.

29. An article loading device according to claim 28, including a fifth switch means engageable by said transfer means for effecting stoppage of said transfer motor moving means.

30. An article loading device according to claim 26, including means for ejecting loaded articles from said transfer means, motor means for actuating said ejecting means, and a fourth switch means actuated by said transfer means for energizing said motor means to actuate said ejecting means.

31. An article loading device according to claim 30, including a fifth switch means actuated by said ejection means at the end of its ejection cycle for effecting stoppage of said ejection actuating motor means.

32. A loading device for handling articles of different sizes comprising a supporting framework, track means mounted upon said framework, article feeder means attached to one side of said framework in substantially perpendicular relation thereto, article receiving means mounted for reciprocation upon said track means and provided with a plurality of article receiving zones, means attached to said framework on the side opposite said article feeder means for arresting movement of the articles delivered to said receiving zones, means mounted adjacent said last named means for actuation by and to be under control of the different sized articles delivered to said receiving zones in a manner for selectively advancing said article receiving means step by step a distance substantially equivalent to the size of the articles being handled thereby to bring said article receiving zones successively into alignment with said article feeding means, means for retracting said article receiving means, and means to discharge the articles from said receiving means upon retraction thereof.

33. In a pallet loading device having a supporting framework divided into forward and rearward compartments, track means mounted upon said framework, article feeding means mounted upon one side of said framework, means attached to said framework on the side opposite said article feeding means for arresting movement of articles fed to said loading device, a vertically movable platform operably mounted within said forward compartment and adapted to support a pallet, means for supporting a stack of empty pallets in said rearward compartment, and means actuated by the lowering of said vertically movable platform with a fully loaded pallet for releasing the lowermost empty pallet in said stack, the combination therewith of article receiving means mounted for reciprocation upon said track means and provided with a plurality of article receiving zones, means to selectively advance said article receiving means step by step to bring each of said article receiving zones successively into alignment with said article feeding means and when fully advanced into vertically aligned and superimposed relationship with said vertically movable platform and the pallet carried thereby, means for retracting said article receiving means to clear the area above said pallet, and means effective upon retraction of said article receiving means to transfer the articles thereon to said pallet.

34. A pallet loading device according to claim 33 including switch means actuated by the lowering of said vertically movable platform to its lowest position thereby to cause said empty pallet releasing means to discharge said lowermost empty pallet in said rearward compartment, and means for driving said released empty pallet against the fully loaded pallet resting upon the fully lowered vertically movable platform to thereby replace said loaded pallet with said empty pallet upon said platform.

35. In a pallet loading device having a supporting framework divided into forward and rearward compartments, track means mounted upon said framework, article feeder means mounted upon one side of said framework, and means attached to said framework on the side opposite said article feeder means for arresting movement of articles fed to said loading device, the combination therewith of article receiving means mounted for reciprocation upon said track means and provided with a plurality of article receiving zones, means for selectively advancing said article receiving means step by step to bring each of said article receiving zones successively into alignment with said article feeder means, a pallet platform mounted for vertical movement within said forward compartment and adapted to support a pallet above which said article receiving means pauses when fully advanced and loaded, means for retracting said article receiving means to clear the area above said pallet, means effective upon retraction of said article receiving means to transfer the articles thereon to said pallet, means adapted to engage the lowermost pallet of a stack of empty pallets for normally supporting said stack within said rearward compartment, means adapted to engage and temporarily support said stack of empty pallets above said lowermost pallet when the latter is released from the stack, means for withdrawing said first-named stack engaging means to release the lowermost empty pallet in said stack and concurrently therewith advance said second-named stack engaging means to engage the succeeding lowermost empty pallet to temporarily support the stack of empty pallets while the released empty pallet is moved forwardly for positioning upon said pallet platform, and means operable in timed sequence for withdrawing said second-named stack engaging means and concurrently therewith advancing said first-named stack engaging means to thereby release the stack from temporary support by said second-named stack engaging means and permit said stack to drop slightly for engagement and normal support by said first-named stack engaging means.

36. In a pallet loading device having a supporting framework divided into forward and rearward compartments, track means mounted upon said framework, article feeder means mounted upon one side of said framework, and means attached to said framework on the side opposite said article feeder means for arresting movement of articles fed to said loading device, the combination therewith of article receiving means mounted for reciprocation upon said track means and provided with a plurality of article receiving zones, means for selectively advancing said article receiving means step by step to bring each of said article receiving zones successively into alignment with said article feeder means, a platform mounted for vertical movement within said forward compartment and adapted to support a pallet above which said article receiving means pauses when fully advanced and loaded, means for retracting said article receiving means to clear the region above said pallet, means effective upon retraction of said article receiving means to transfer the articles thereon to said pallet, a plurality of pallet stack supporting members mounted for rocking movement within said rearward compartment, said members at their lower ends having means adapted to engage the lowermost pallet of a stack of empty pallets for normally supporting said stack within said compartment and at their upper ends having means adapted to engage and temporarily support said stack of empty pallets above said lowermost pallet when the latter is released from the stack, means for rocking said supporting members to release the lowermost empty pallet in said stack and concurrently therewith engage the succeeding lowermost empty pallet to temporarily support the stack of empty pallets while the released empty pallet is moved forwardly for positioning upon said vertically movable platform, and means operable in timed sequence for reversing said last-named means to effect reverse rocking movement of said members to release the means at the upper ends of same from the stack and permit the latter to drop slightly for engagement and normal support by the means at the lower ends of said members.

37. In a pallet loading device having a supporting framework divided into a forward compartment and a rearward compartment, track means mounted upon said framework in a manner to traverse said compartments, conveyor means for conducting the articles to be loaded to said loading device, article arresting means attached to said framework on the side opposite to said conveyor means for limiting movement of articles fed to said loading device, a pallet supporting and vertically movable platform mounted within said forward compartment, supporting means for a stack of empty pallets mounted within said rearward compartment, means for releasing the lowermost empty pallet in said stack actuated by the lowering of said vertically movable platform when fully loaded, means for moving said empty pallet to said forward compartment from said rearward compartment thereby displacing said fully loaded pallet, and means for raising said vertically movable platform to its uppermost position, the combination therewith of article receiving means mounted for reciprocation upon said track means and provided with a plurality of article receiving zones, switch means actuated by the articles passing over said conveyor means, counter means actuated by the closing of said switch means, a second switch means actuated by said counter means, an orienting means mounted in juxtaposition with said conveyor means and including an obstruction actuated by the closing of said second switch means in a manner to project to one side of the center and in the path of the oncoming articles passing over said conveyor means, means actuated by said articles for selectively advancing said article receiving means step by step to bring each of said article receiving zones successively into alignment with said conveyor means and when fully advanced into vertically aligned and superposed relationship with said vertically movable platform and the pallet carried thereby, means actuated by said article receiving means when fully advanced for retracting said receiving means to clear the area above said pallet, means for discharging said articles onto said pallet from said article receiving means upon retraction of the latter, and means actuated by and under the control of the articles on said pallet for lowering said vertically movable platform.

38. A pallet loading device comprising article feeding means, article receiving means provided with a plurality of article receiving zones, means actuated by the articles delivered to each of said zones for selectively advancing said article receiving means step by step to bring the article receiving zones individually and successively into alignment with said article feeding means, means for positioning an empty pallet in a plane beneath the plane of movement of said article receiving means and substantially in vertically aligned relationship with the fully advanced and fully loaded position of said article receiving means, means for effecting transferral of the articles from said fully loaded article receiving means to said empty pallet, and means for moving said pallet to a succeeding load receiving position.

39. A pallet loading device comprising article feeding means, article receiving means provided with a plurality of article receiving zones, means actuated by the articles delivered to said zones for selectively advancing said article receiving means step by step to bring each of said article receiving zones successively into alignment with said article feeding means, means for positioning an empty pallet in a load receiving position within said device, means actuated by said article receiving means including means for wiping the articles from the fully loaded article receiving means onto said pallet, and means for moving the pallet to a succeeding load receiving position.

(References on following page)

References Cited in the file of this patent

UNITED STATES PATENTS

| | | | |
|---|---|---|---|
| 628,220 | Crossman | July 4, | 1899 |
| 680,433 | Huson | Aug. 13, | 1901 |
| 1,243,407 | Hawthorne | Oct. 16, | 1917 |
| 1,247,722 | Rogers et al. | Nov. 27, | 1917 |
| 1,269,115 | Reese | June 11, | 1918 |
| 1,551,890 | Luce | Sept. 1, | 1925 |
| 1,615,250 | Wilcox | Jan. 25, | 1927 |
| 1,639,576 | Semashko | Aug. 16, | 1927 |
| 1,646,067 | Roberts | Oct. 18, | 1927 |
| 1,646,381 | Roberts | Oct. 18, | 1927 |
| 1,661,969 | Semashko | Mar. 6, | 1928 |
| 1,811,139 | Laubach | June 23, | 1931 |
| 2,065,674 | Fay, Jr. | Dec. 29, | 1936 |
| 2,120,315 | Spellacy et al. | June 14, | 1938 |
| 2,370,325 | Ranney | Feb. 27, | 1945 |
| 2,387,674 | McIntire | Oct. 23, | 1945 |
| 2,508,861 | Jessen | May 23, | 1950 |
| 2,633,251 | Bruce | Mar. 31, | 1953 |